(12) United States Patent
Aitken et al.

(10) Patent No.: US 7,130,907 B2
(45) Date of Patent: Oct. 31, 2006

(54) WIRELESS MOBILITY SERVICES PLATFORM WITH PACKAGE-BASED DATABASE STRUCTURE

(75) Inventors: David James Aitken, Dublin (IE); Aidan Dillon, Dublin (IE)

(73) Assignee: Markport Limited, Dublin (IE)

( * ) Notice: Subject to any disclaimer, the term of this patent is extended or adjusted under 35 U.S.C. 154(b) by 778 days.

(21) Appl. No.: 10/173,974

(22) Filed: Jun. 19, 2002

(65) Prior Publication Data

US 2004/0198352 A1    Oct. 7, 2004

Related U.S. Application Data

(63) Continuation of application No. PCT/IE00/00165, filed on Dec. 21, 2000.

(30) Foreign Application Priority Data

Dec. 23, 1999    (IE) .................................... 991094

(51) Int. Cl.
    *G06F 13/00*    (2006.01)
(52) U.S. Cl. ...................... 709/225; 709/227; 709/249; 455/560
(58) Field of Classification Search ................ 209/223, 209/224, 225, 226, 227, 249; 455/560
    See application file for complete search history.

(56) References Cited

U.S. PATENT DOCUMENTS

| | | | |
|---|---|---|---|
| 5,497,412 A | | 3/1996 | Lannen et al. ................ 379/60 |
| 5,517,562 A | * | 5/1996 | McConnell ............ 379/201.03 |
| 5,901,352 A | | 5/1999 | St-Pierre et al. ............ 455/426 |
| 5,953,662 A | | 9/1999 | Lindquist et al. ........... 455/433 |
| 6,453,174 B1 | * | 9/2002 | Cunningham et al. ...... 455/560 |
| 6,519,266 B1 | * | 2/2003 | Manning et al. ............ 370/469 |
| 6,535,737 B1 | * | 3/2003 | Karlsson ..................... 455/434 |
| 6,714,987 B1 | * | 3/2004 | Amin et al. ................. 709/249 |
| 6,876,634 B1 | * | 4/2005 | Lim ........................ 370/310.1 |
| 2003/0224820 A1 | * | 12/2003 | Einola et al. ............ 455/554.1 |

FOREIGN PATENT DOCUMENTS

| | | |
|---|---|---|
| WO | WO96/15633 | 5/1996 |
| WO | WO97/36440 | 10/1997 |
| WO | WO 01/49052 A1 * | 5/2001 |

* cited by examiner

*Primary Examiner*—Viet D. Vu
(74) *Attorney, Agent, or Firm*—Jacobson Holman PLLC

(57) ABSTRACT

A wireless mobility services platform (1) has a high-speed network interconnecting an operations and maintenance processor (2) for performing platform administration and management functions, a network access processor for handling signalling traffic, and a database server (4) comprising a memory subscriber database distributed across hardware platforms according to a fault-tolerant redundancy scheme. A platform software layer (12) comprising common communication and database access functions is hosted on the operations and maintenance processor, the network access processor, and on the database server. A signal relay layer (13) is hosted on the network access processor.

6 Claims, 4 Drawing Sheets

Package Oriented Database Structure

Stack Variants Supported by NAP

Small Scale Redundant Configuration

Large Scale Fully Redundant Configuration

WIRELESS MOBILITY SERVICES PLATFORM WITH PACKAGE-BASED DATABASE STRUCTURE

This is a continuation of PCT/IE00/00165, filed Dec. 21, 2000 and published in English.

INTRODUCTION

The invention relates to a wireless mobility services platform for deployment in any of a range of network protocols including GSM, ANSI41, or PDC.

The objects of the invention are to provide some or all of the following:
 (a) network resilience,
 (b) high capacity,
 (c) on-line upgrade capability,
 (d) flexible allocation and provisioning of network data,
 (e) high performance,
 (f) quick and simple deployment of new applications.

SUMMARY OF THE INVENTION

According to the invention, there is provided a wireless mobility services platform comprising a network interconnecting:
 an operations and maintenance processor comprising means for performing platform administration and management functions;
 a network access processor comprising means for handling signalling traffic;
 a database server comprising a memory subscriber database distributed across a plurality of hardware platforms according to a fault-tolerant redundancy scheme;
 a platform software layer comprising common communication and database access functions hosted on the operations and maintenance processor, the network access processor, and on the database server, and
 a signal relay layer hosted on the network access processor.

In one embodiment, the signal relay layer comprises means for monitoring signal traffic according to filter criteria.

In one embodiment, the signal relay layer comprises means for triggering applications based on said monitoring.

In one embodiment, the signal relay layer comprises means for forwarding signals to an original destination and for relaying signals to an alternative destination according to inspection of operations in incoming signals.

In one embodiment, the signal relay layer comprises means for generating a response by simulating an application residing on the platform.

In another embodiment, the database server comprises means for maintaining a package-based database structure.

In one embodiment, the structure comprises core, HLR, routing, application, and trigger packages.

In one embodiment, the database server is configured in a 2N redundant configuration with two real time locations for all subscriber data.

In one embodiment, the database server comprises means for maintaining a disk subscriber database on the operations and maintenance processor in addition to internal live and standby subscriber databases.

In one embodiment, the operations and maintenance processor comprises means for allowing user updating of subscriber data on said database.

In one embodiment, the operations and maintenance processor comprises means for performing event handling in which events are received from within the platform and are logged to a database.

In one embodiment, the operations and maintenance processor comprises means for synchronising timing across all processors of the platform.

DETAILED DESCRIPTION OF THE INVENTION

Brief Description of the Drawings

The invention will be more clearly understood from the following description of some embodiments thereof, given by way of example only with reference to the accompanying drawings in which.

DESCRIPTION OF THE EMBODIMENTS

Figure 1:
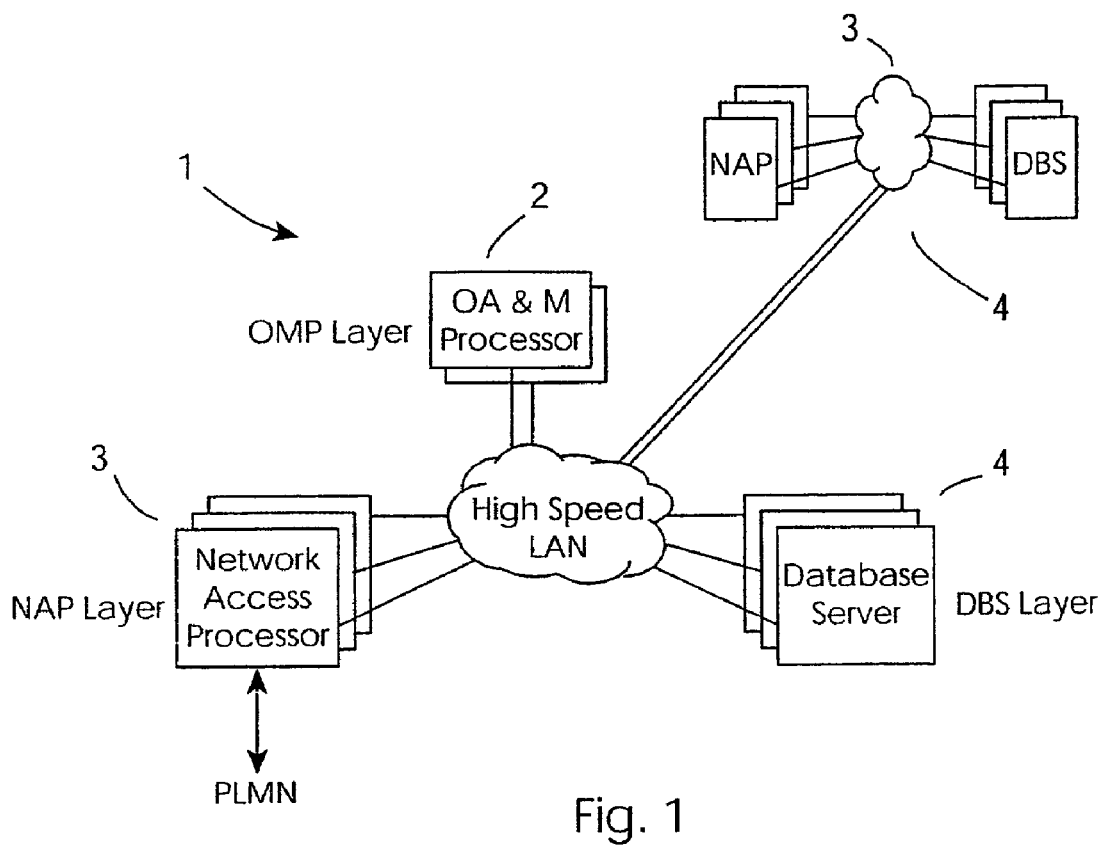
FIG. 1 is an overview schematic representation of a platform of the invention.

Referring to FIG. 1, the overall architecture of a wireless mobility services platform 1 is illustrated. The platform has a distributed three layer or component architecture whereby the various functional components of the system can be deployed on multiple hardware platforms that can be co-located or geographically distributed.

The layers are:

OMP: Operations and Maintenance Processor 2.
 The OMP provides fully centralised administration and management of all parts of the platform and supports mediation with an operator's Subscriber Administration and Network Management system.

NAP: Network Access Processor 3.
 The NAP is a Signalling End Point responsible for handling all SS7 and X.25 signalling traffic and execution of any MAP protocol. The NAPs may be deployed in either 2N redundant or N+1 load sharing configurations depending on the requirement of the supported application.

DBS: Database Server 4.
 The DBS provides a fully centralised, redundant, in-memory (RAM) subscriber database for the platform 1. The DBS is always deployed in 2N redundant configurations, ensuring that all subscriber data is maintained in at least two real time locations and thus there is no loss of service in the event of failure of a single DBS system. Data updates are synchronised across DBS instances and the OMP.

The advantages of this arrangement include:

Centralised Management and Provisioning Interface.
 The standalone OMP component allows multiple platforms to be managed and provisioned as a single logical system. The OMP is the only platform that needs to interface to an Operator's Network Management and Subscription Management systems.

Resilience
  Both NAP and DBS components can be deployed in 2N redundant configurations to ensure full resilience against the failure of a single system. Availability levels of almost 100% can be provided. Failure detection is a fundamental feature of the platform and does not rely on third party products such as HP ServiceGuard™.

Performance
  As the Network Access Layer (NAP) and the Database Server (DBS) are logically separate systems that can be deployed on separate platforms, all deployments can be tailored to meet the precise performance and capacity requirements of the actual application being implemented.
  Applications requiring significantly greater Performance at the Network Layer than in the Database Server can be implemented with proportionately greater processing power for the NAP systems than in the DBS systems, and vice versa.

Easy Capacity and Feature Upgrade.
  The distributed architecture ensures that there is no loss of service when adding extra systems to provide additional capacity. Similarly, the 2N redundant configuration allows Standby systems to be upgraded to new Application or OS software versions without impacting live services.

Figure 2:
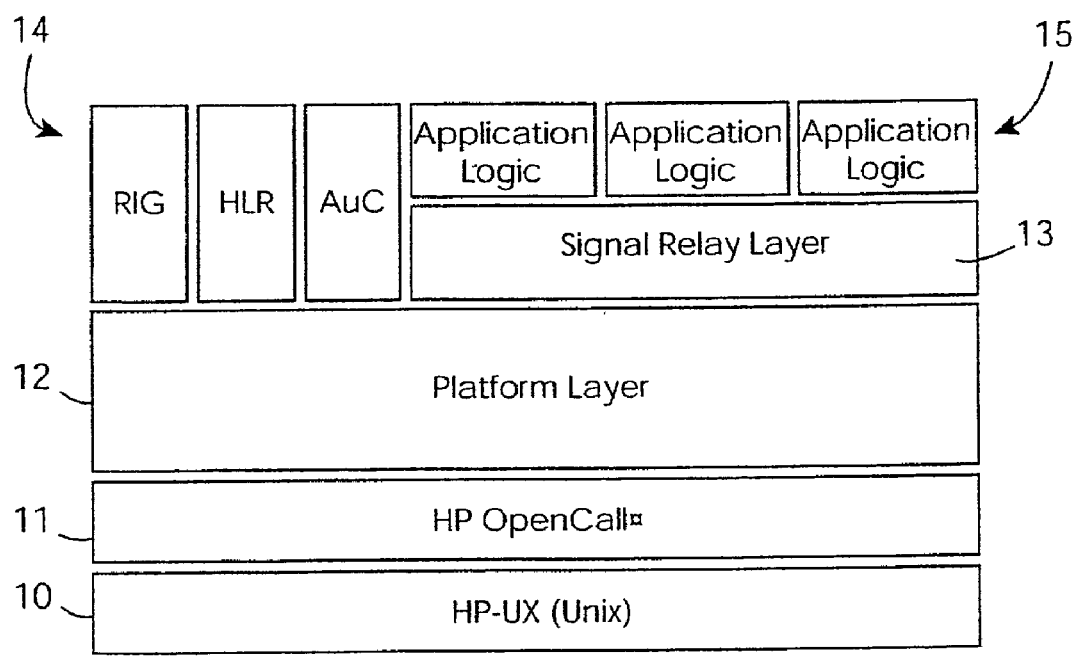
FIG. 2 is a software architecture diagram.

Referring now to FIG. 2, the software structure of the platform 1 is shown. Each layer resides on one or more of the architecture components shown in FIG. 1, as follows.
    HP-UX™ (Unix) 11. This is the operating system and resides on the OA & M 2, the NAP 3, and the DBS 4.
    HP Open Call™ 11. This is a Hewlett Packard™ third party stack and it resides on the NAP 3.
    Platform Layer 12. This comprises the common software functions such as communication functions and database access function. It resides on all components 2, 3, and 4.
    Signal Relay Layer (SRL) 13. This monitors incoming signals and performs filtering and relaying operations according to configurable criteria. It resides on the NAP 3.
    Major applications 14. These are large-scale applications such as a RIG, a HLR, or an AuC. They reside at least partly on all architecture components 2, 3, and 4.
    Smaller applications 15. These are smaller-scale applications which may be added to the platform 1 in a modular manner. They at least partly reside on all three components.

The architecture of FIG. 1 and the software structure of FIG. 2 allow new and custom applications to be quickly developed and deployed in a cost-effective manner. Multiple applications can be co-hosted. Application specific logic resides on the NAP component, where network traffic can be handled according to the particular requirements of the implemented service.

Figure 3:
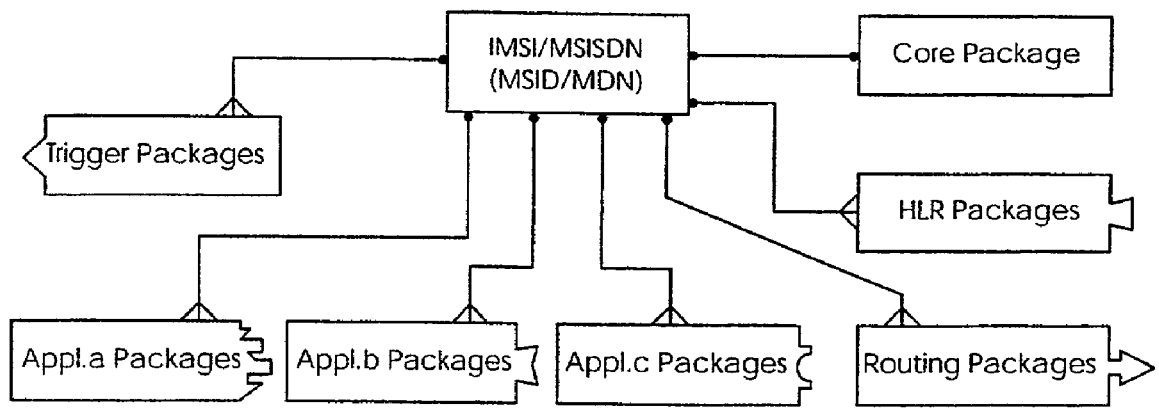
FIG. 3 is a diagram illustrating a package-oriented database structure.

Subscriber data is stored in the DBS RAM database and in secure storage on the OMP. The package oriented database design used allows new data types and structures to be easily implemented without the need for complicated and time-consuming modifications to a fixed database schema. All entries may be dual keyed by MSISDN or IMSI (MDN & MIN in ANSI 41) or equivalents. An illustration of the database package structure is shown in FIG. 3. The structure includes core, HLR, routing, application, and trigger packages. The modular nature of the platform also allows for frequent re-use of common components.

Figure 4:
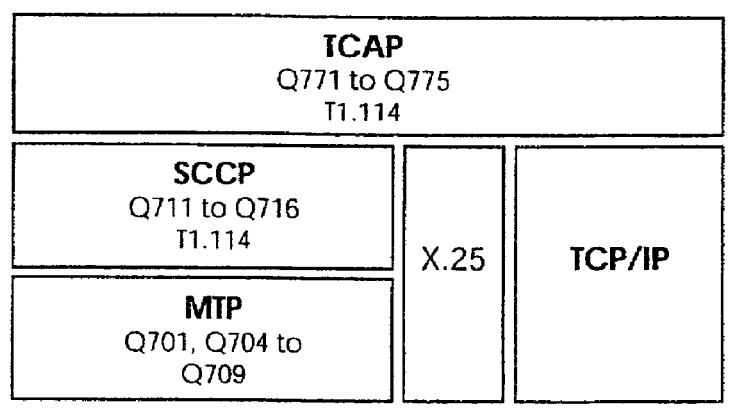
FIG. 4 is a diagram illustrating variants supported.

The following describes the architecture components in more detail. The NAP 3 is a highly available, highly performant Network Server responsible for handling all SS7 and X.25 network traffic. Each NAP platform can support up to 32 SS7 links. The application logic for the various products resides on the NAP, as this is where MAP, TCAP and SCCP primitives can be managed. NAP stacks are illustrated in FIG. 4.

SS7 Stack Options
  The following stack varieties are supported:
GSM ITU SS7
  MAP Phase 2+, 2 and 1
  TCAP (White Book)
  SCCP (Blue Book)
  MTP (Blue Book)

ANSI-41/ANSI SS7
  MAP ANSI Revs A,B,C,D
  TCAP ANSI T1.114
  SCCP ANSI T1.112
  MTP ANSIT1.111

Hybrid Stack
  GSM/ITU MAP over ANSI TCAP and below

Reverse Hybrid Stack
  ANSI MAP over GSM/ITU TCAP and below

ANSI variants using MAP over X.25 or TCP/IP are also possible.

Configurations
  There are two possible NAP configurations, Active/Standby (also known as 2N Redundant) and Load Sharing, where high-availability is provided through N+1 redundancy.

2N Redundant
  This configuration consists of N active NAP nodes, each with a hot standby partner node, which is immediately available to take over in the event of any failures in the live system. The recovery time is guaranteed to be no more than 6 seconds. All SS7 links remain active during recovery, and the subsystems remain in service.
  Each NAP pair has a single point code per protocol stack. The addition of a new pair requires the assignment of additional point codes.

N+1 Redundant
  In this configuration, N active platforms share the network. In the event of the failure of one of the platforms, the load is redistributed amongst the remaining systems. This configuration is dependent on the remainder of the home SS7 network supporting SCCP Global Title Routing and being able to switch the GT translation to a different NAP if the primary NAP is unavailable. Point code aliasing could also be used, where supported.
  During recovery, all links are lost and the subsystems go temporarily out of service.

Database Server (DBS)
  The DBS provides a fully centralised, redundant, in-memory (RAM) subscriber database for applications running on the platform 1. The DBS is always deployed in a 2N Redundant configuration ensuring that all subscriber data is maintained in at least two real-time locations and thus there is no loss of service in the event of the failure of a single DBS instance.
  Each DBS memory database is fully synchronised with its peer DBS (in the 2N Redundant pair) and the disk database stored on the OMP. For each pair, one DBS will be configured to be live and one will be the shadow. The live/shadow combination of DBS systems is configured to maintain maximum redundancy in case of failure.

When an application sends an update request to the active DBS, the active DBS can be configured in one of three ways, depending on the nature of the service and Network Operator's requirements:

1. Database update on the active DBS and response to client Application only takes place after shadow DBS has replicated the data. This is the most secure method.
2. The active DBS does not wait for shadow DBS acknowledgement before updating its database. However, it does not respond to the client Application until the shadow acknowledgement is received.
3. The active DBS does not wait for shadow acknowledgement before updating its database and responding to the client Application. This is the fastest mode and is designed for applications requiring rapid response times.

Operations and Maintenance Processor (OMP)

The Operations and Maintenance Processor provides full administration and management of the platform 1 including mediation with the operators Subscriber Administration and Network Management systems.

The OMP also contains the disk database and plays a major role in database synchronisation.

The OMP is responsible for the following tasks:
Startup and shutdown of the DBS and NAP machines
Modifications to subscriber disk database
Maintenance and reporting of event information
The OMP consists of the following logical entities:

OMP Manager
Creates OMP UNIX processes, co-ordinates startup/shutdown of DBSs and NAPs.

RDBMS
Third-party database (OpenIngres™) used to store MSDP information to disk for recover in event of failure.

System Administration Terminals
Graphical user interfaces (GUI) for the MSDP and associated application. Multiple instances can be run locally or remotely over TCP/IP Provisioning Interface
Used to create/read/update/delete subscribers. A fully-functional MML is used to allow external systems to remotely manage all subscriber data.

Event Handler
Receives events/alarms from entities within the system. Optionally logs them to event monitor and to a UNIX file (which may be a special file, e.g. RS-232, TCP/IP Socket etc.)

Platform Monitor
Monitors and displays the state of platform nodes (DBS, NAP). Multiple instances can be run locally or remotely over TCP/IP DBS Interface
Used to update the DBSs with subscriber information when the system is started or a subscriber is added/modified/deleted from the Provisioning Interface. Also used by the DBSs to secure updates from the NAPs to the disk database Timing Interface
Used to synchronise system time on all machines (uses Network Time Protocol).

An advantageous feature of the platform 1 is the Signal Relay Layer 13 as it provides the ability to monitor SS7 traffic in the network and trigger applications based on inspection of operations at SCCP, TCAP or MAP levels. Inspected operations can be:
Forwarded on to the original destination
Relayed to an alternative destination
Responded to at MAP level with simulation as if the platform application were the system to which the operation was originally sent.

This ability allows the platform to support applications such as Number Portability, or act as an Address Register in a network containing multiple HLRs.

Figure 5:
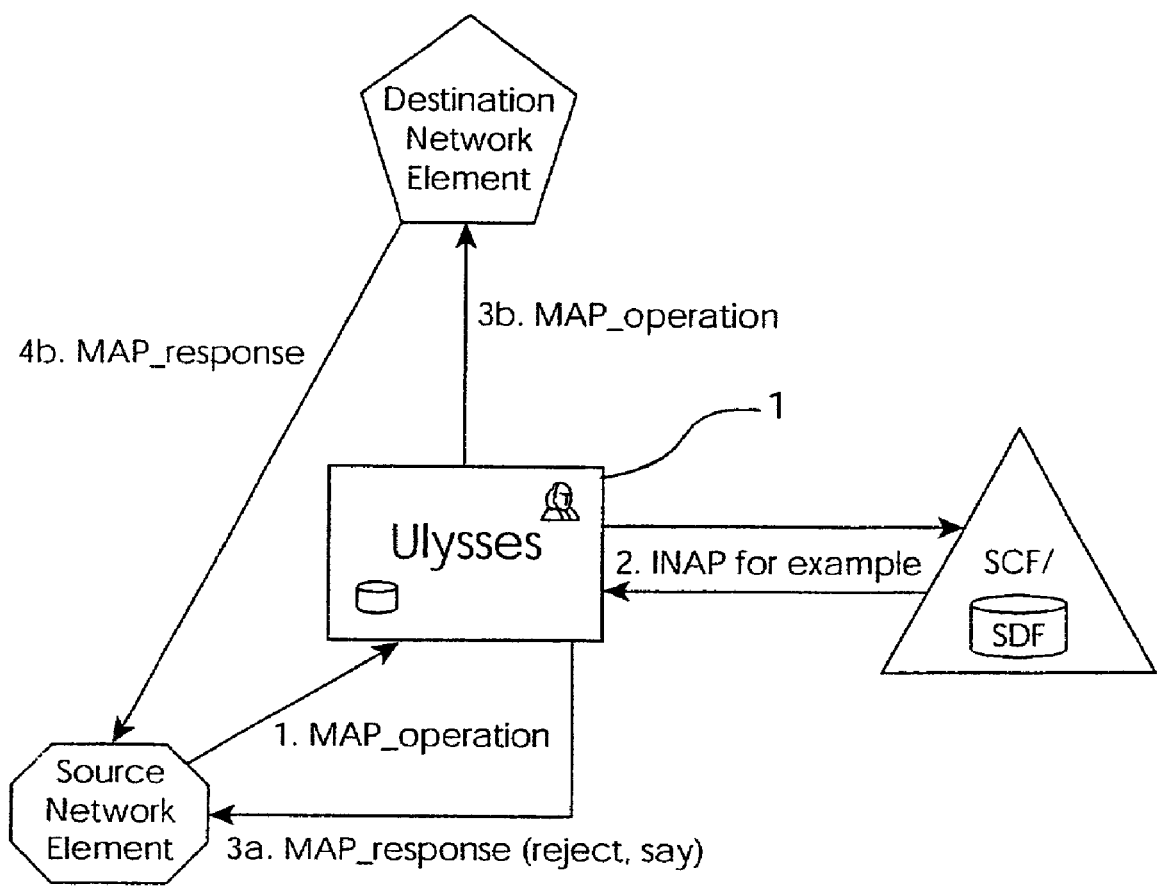
FIG. 5 is a diagram showing service triggering.

The decision to Forward, Relay or Respond can be made using data contained on the platform or by querying an external system using MAP, INAP, TCP/IP or other protocol. An example of triggering is shown in FIG. 5, in which the platform is called "Ulysses". In this example, the platform generates an INAP signal 2 and subsequently a MAP operation 3b for a destination network element, before a MAP response is provided from the destination network element to the source network element.

Figure 6:
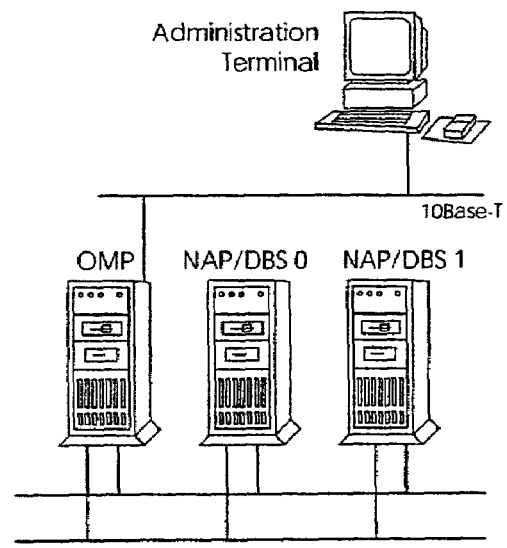
FIGS. 6 and 7 are diagrams showing hardware architectures for two hardware platform configurations, one small scale and the other large scale.
Figure 7:
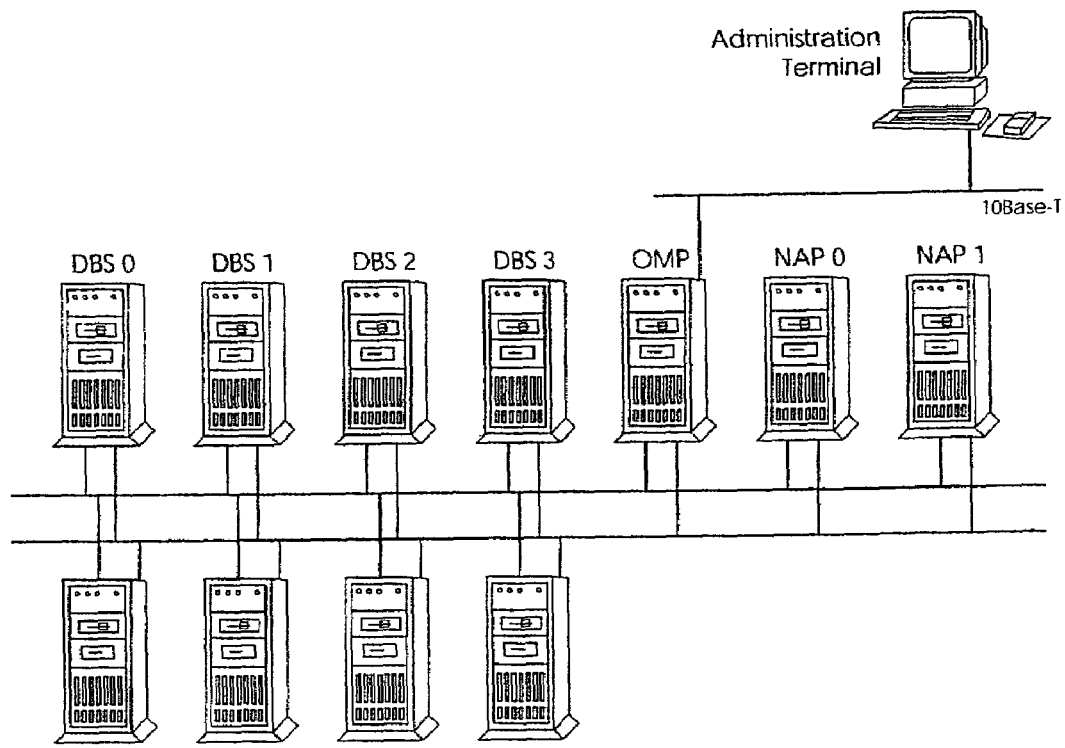

FIGS. 6 and 7 illustrate two typical configurations that demonstrate the flexibility of the architecture and its ability to be tailored to meet the individual requirements of particular applications and operators. FIG. 6 shows a small to medium deployment with redundancy. This configuration would be suitable for applications that require redundancy but where the capacity and performance requirements are not that high, for example Number Portability applications in a small GSM network.

Three platforms are deployed:
One HP D2xx series standalone OMP with Admin Terminal for all System Management purposes.
Two HP K4xx series in an Active/Standby (2N Redundant configuration). Both the NAP and DBS software runs on each machine.

FIG. 10 shows a large scale multi-node configuration with full redundancy. This particular configuration represents an instance of a large Roaming Interworking Gateway (RIG) between ANSI-41 and GSM. There are eleven systems in all.
1 HP D2xx series standalone OMP
4 HP K3xx series DBS platforms
2 HP K4xx NAP platforms
2 HP D2xx series ANSI-41 Authentication Centres
2 HP D2xx series GSM Authentication Centres Regarding transaction rates of the platform 1, it is possible to deploy the platform in configurations handling from 10s to 1000s of transactions per second sustained traffic during the busy hour. Regarding response times, the platform 1 will turn messages around in 200–700 ms depending on the protocol handling needed and the database requirements. Ultimately the response time will be dependent on the application. A reasonable assumption is that they can respond in 500 ms or less for 95% of service instances during the busy hour.

In 95% of cases during the busy hour, the target response times for applications are in the region of:
150 ms response time for simple SCCP relay
200 ms response time when trigger logic is executed (i.e. MAP is analysed) and no service database is accessed
Additional 100 ms for each access of DBS
Additional 100 ms for invocation of service logic and sending a MAP response
Additional 300 ms for invocation of a single external SCF/SDF transaction. This is excluding the time spent in the external SCF/SDF.

Regarding database sizing, the platform 1 can support in the order of 6 Million HLR type data records. Other applications, such as Number Portability require less data, and up to 10 million such records can be handled.

The invention is not limited to the embodiments described, but may be varied in construction and detail.

The invention claimed is:

1. A wireless mobility services platform comprising a network interconnecting:
    an operations and maintenance processor comprising means for performing platform administration and management functions;
    a network access processor comprising means for handling signalling traffic;
    a database server comprising a memory subscriber database distributed across a plurality of hardware platforms according to a fault-tolerant redundancy scheme, the server comprising means for maintaining a package-based database structure with core, HLR, routing, application, and trigger packages;
    a platform software layer comprising common communication and database access functions hosted on the operations and maintenance processor, the network access processor, and on the database server, and
    a signal relay layer hosted on the network access processor, said signal relay layer comprising means for inspecting operations in incoming signals and for, in response to said inspection, relaying signals to an original destination, relaying signals to an alternative destination, or acting as a proxy for an application residing on the platform to generate a response with simulation, and monitoring signal traffic according to filter criteria, and triggering applications based on said monitoring.

2. A wireless mobility services platform as claimed in claim 1, wherein the database server is configured in a 2N redundant configuration with two real time locations for all subscriber data.

3. A wireless mobility services platform as claimed in claim 2, wherein the database server comprises means for maintaining a disk subscriber database on the operations and maintenance processor in addition to internal live and standby subscriber databases.

4. A wireless mobility services platform as claimed in claim 3, wherein the operations and maintenance processor comprises means for allowing user updating of subscriber data on said database.

5. A wireless mobility services platform as claimed in claim 1, wherein the operations and maintenance processor comprises means for performing event handling in which events are received from within the platform and are logged to a database.

6. A wireless mobility services platform as claimed in claim 1, wherein the operations and maintenance processor comprises means for synchronising timing across all processors of the platform.

* * * * *